US008629799B2

(12) United States Patent
Shope

(10) Patent No.: US 8,629,799 B2
(45) Date of Patent: Jan. 14, 2014

(54) SURFACE PENETRATING RADAR SYSTEM AND TARGET ZONE INVESTIGATION METHODOLOGY

(75) Inventor: Steven M. Shope, Mesa, AZ (US)

(73) Assignee: Sandia Research Corporation, Mesa, AZ (US)

( * ) Notice: Subject to any disclaimer, the term of this patent is extended or adjusted under 35 U.S.C. 154(b) by 477 days.

(21) Appl. No.: 13/075,992

(22) Filed: Mar. 30, 2011

(65) Prior Publication Data

US 2012/0249356 A1    Oct. 4, 2012

(51) Int. Cl.
*G01S 13/04*    (2006.01)
*G01S 13/08*    (2006.01)

(52) U.S. Cl.
USPC ............................................ 342/22; 342/120

(58) Field of Classification Search
USPC .................................................. 342/22, 120
See application file for complete search history.

(56) References Cited

U.S. PATENT DOCUMENTS

| | | | | |
|---|---|---|---|---|
| 4,023,026 | A * | 5/1977 | O'Farrell | 708/252 |
| 4,951,263 | A | 8/1990 | Shope | |
| 5,731,782 | A * | 3/1998 | Walls | 342/145 |
| 6,211,807 | B1 * | 4/2001 | Wilkison | 342/22 |
| 6,664,914 | B2 | 12/2003 | Longstaff et al. | |
| 7,259,713 | B1 * | 8/2007 | Matich et al. | 342/145 |
| 7,532,160 | B1 * | 5/2009 | Zimmerman et al. | 342/357.27 |
| 7,642,952 | B2 | 1/2010 | Fukuda | |
| 7,656,352 | B2 * | 2/2010 | Alban et al. | 342/458 |
| 7,659,847 | B2 | 2/2010 | Bausov et al. | |
| 7,724,182 | B2 | 5/2010 | Inoue et al. | |
| 7,812,761 | B2 * | 10/2010 | Shirakawa | 342/195 |
| 7,855,677 | B2 | 12/2010 | Negoro et al. | |
| 2005/0062639 | A1 | 3/2005 | Biggs | |
| 2008/0218170 | A1 | 9/2008 | Stolarczyk et al. | |
| 2009/0167589 | A1 | 7/2009 | Bausov | |
| 2010/0052970 | A1 | 3/2010 | Moussally et al. | |

\* cited by examiner

*Primary Examiner* — Matthew M Barker
(74) *Attorney, Agent, or Firm* — Schmeiser, Olsen & Watts LLP; Charlene R. Jacobsen

(57) ABSTRACT

A radar system (22) includes a transmitter (45), a receiver (59), and a software defined radio (SDR) peripheral (40). Methodology (80) for investigating a target zone (26) utilizing the system (22) entails generating (106) a direct sequence spread spectrum (DSSS) code (120) having a code length (122) corresponding to a time duration of radio wave travel between the transmitter (45), the target zone (26), and the receiver (59) at a carrier frequency (112). A beacon signal (34), modulated (108) by the DSSS code (120), is transmitted (152) from the transmitter (45) toward the target zone (26) and a return signal (38) is received (156) at the receiver (56). The return signal (38) is compared (170) to a replica signal (168) characterized by the DSSS code (120), and presence of an object (32) in the target zone (26) is ascertained (178) when the return signal (38) matches the replica signal (168).

19 Claims, 8 Drawing Sheets

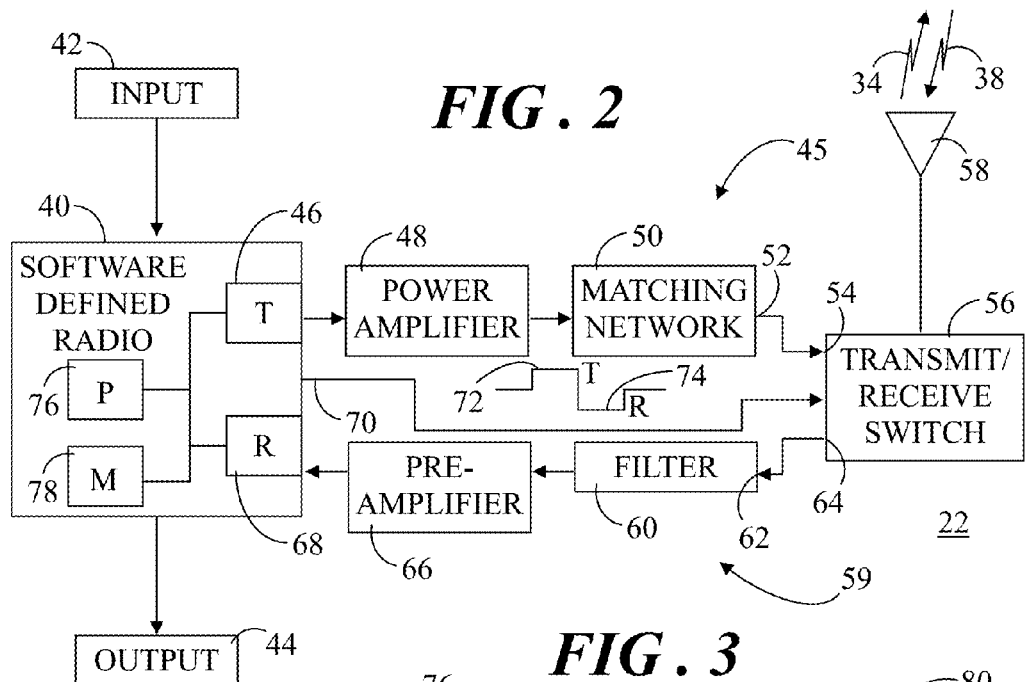
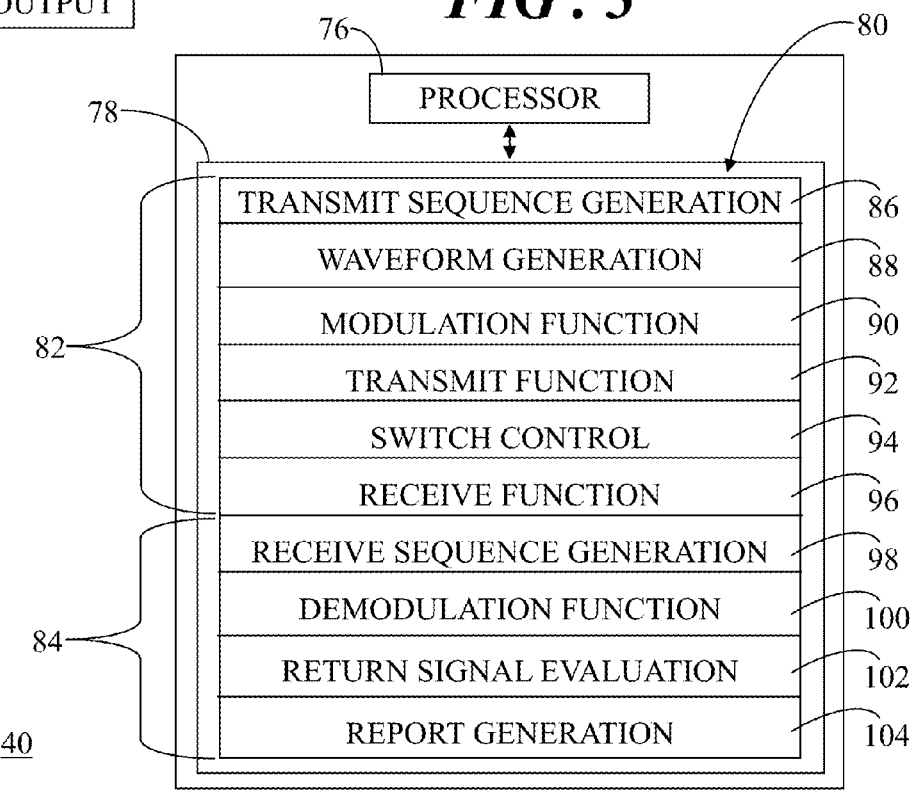

SURFACE PENETRATING RADAR SYSTEM AND TARGET ZONE INVESTIGATION METHODOLOGY

TECHNICAL FIELD OF THE INVENTION

The present invention relates to the field of surface penetrating radar systems. More specifically, the present invention relates to a surface penetrating radar system using a spread spectrum methodology for controlling penetration distance.

BACKGROUND OF THE INVENTION

Surface penetrating radar, also referred to as ground penetrating radar (GPR), is used to investigate the surface and subsurface features of a target zone or area. In general, GPR uses transmitting and receiving antennas, or only one antenna containing both functions. The transmitting antenna typically radiates short pulses of high-frequency radio waves into the ground. When the wave hits a buried object or a boundary with different electromagnetic properties, the wave is reflected from the object or boundary, and a receiving antenna records the reflected return signal. The return signals can be used to locate and/or construct an image of what is underground because the return signals will vary depending on the depth and composition of buried objects.

There are many applications for GPR in a number of fields. For example, GPR is used in the Earth sciences to study bedrock, soils, groundwater, and ice. Engineering applications include nondestructive testing (NDT) of structures and pavements, locating buried structures and utility lines, and studying soils and bedrock. In environmental remediation, GPR is used to define landfills, contaminant plumes, and other remediation sites, while in archaeology it is used for mapping archaeological features and cemeteries. GPR is used in law enforcement for locating clandestine graves and buried evidence, and military uses include detection of buried mines and unexploded ordnance as well as subterranean tunnels and fortifications.

Aerial or airborne GPR systems are advantageous in regions where direct contact with the ground is impossible or dangerous, and/or in regions where non-invasive radar imaging is to take place. Existing airborne GPR systems are broad band, complex, heavy, and require large and expensive to operate aircraft to carry the GPR systems. Additionally, the wide bandwidth of conventional GPR systems can cause distortion, i.e., frequency dependent attenuation, and dispersion, i.e., frequency dependent velocity, which can greatly limit the penetration distance and reflection time resolution. Thus, systems that achieve improved penetration distance and reflected signal recovery, while concurrently achieving reduced cost, size, and weight are needed so that ground penetrating radar can be more extensively and usefully employed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a block diagram of the airborne radar system of the present invention;

FIG. 3 shows a diagram of a software defined radio implementation of the radar system of FIG. 2;

DETAILED DESCRIPTION

Embodiments of the invention entail a surface penetrating radar system and associated methodology for investigating the surface and subsurface of a target zone. The radar system and methodology implement a narrow bandwidth direct sequence spread spectrum (DSSS) code. The narrow bandwidth can minimize frequency dependent dispersion and distortion. In addition, the DSSS code enables greater process gains for adaptation to different distances of subsurface penetration and improved reflected signal recovery. A long, DSSS coded, narrow bandwidth radar waveform signal advantageously enables the energy of the waveform to be distributed over the entire DSSS code sequence so that peak power requirements of the transmitter can be greatly reduced. The relatively low peak power requirements of the radar system allow smaller and lighter radar components suitable for airborne applications, such as manned aircraft and unmanned aerial vehicles (UAV).

Figure 1:
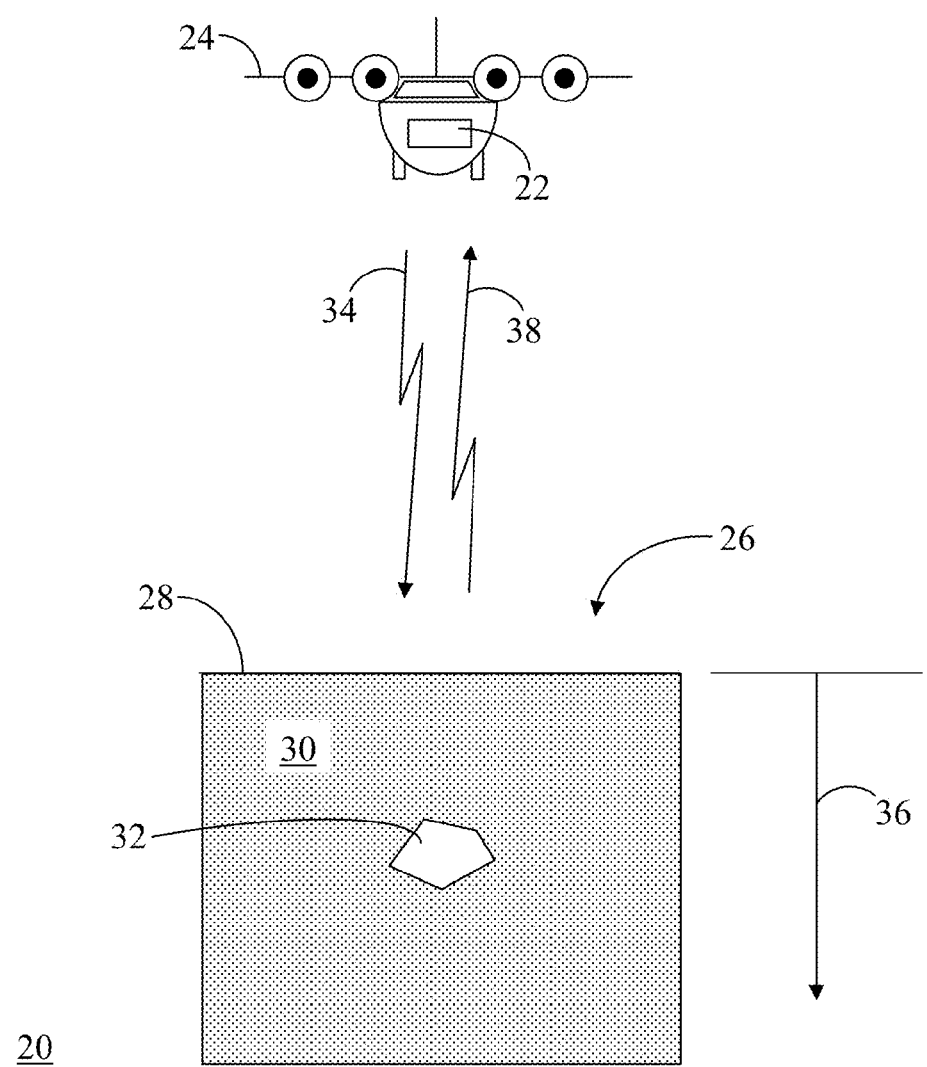
FIG. 1 shows a diagram of an environment in which an airborne radar system may be implemented in accordance with an embodiment of the present invention.

FIG. 1 shows a diagram of an environment 20 in which an airborne radar system 22 may be implemented in accordance with an embodiment. In an embodiment, radar system 22 is housed at a reference platform, and more particularly, an airborne platform, such as a manned airplane, a helicopter, an unmanned aerial vehicle, a satellite, a spacecraft, and so forth. The reference platform in this example is an airplane 24 flying over a target zone 26 of interest. Target zone 26 may be a surface 28 and/or subsurface region 30 of the earth or another planet. In this illustration, target zone 26 may be investigated by radar system 22 in order to detect the presence of an object 32 or objects in subsurface region 30. Alternatively, radar system 22 may be used to detect the presence of object 32 when it is located on surface 28, but is hidden by foliage, buildings, fortifications, and so forth.

Radar system 22 is discussed below in connection with an airborne platform and investigating the surface and subsurface of the earth. However, radar system 22 is not limited to use in an airborne platform. In alternative embodiments, the reference platform at which radar system 22 is located may be a tower, a mountain, a stand, and so forth, such that the reference platform is positioned at or near the surface of interest. Nor is radar system 22 limited for use in ground penetrating scenarios. In alternative embodiments, radar system 22 may be used to investigate target zones by penetration through the side surface of a building, and the like.

Object 32 may be an item such as a buried structure, a utility line, an archeological feature, a grave, buried evidence, a buried mine, wire for an improvised explosive device (IED), unexploded ordnance, subterranean tunnel, and so forth. In alternative embodiments, object 32 may be a boundary between different materials or media such as various layers of bedrock, soils, groundwater, ice, and so forth. In general, object 32 represents media with different intrinsic electromagnetic properties than its surroundings. These electromagnetic properties can include, for example, a dielectric constant, conductivity, magnetic permeability, and so forth.

As will be described in detail below, a beacon signal 34 is transmitted from radar system 22. Beacon signal 34 is adapted to penetrate target zone 26 a predetermined penetration distance 36 at or below surface 28. The particular modulation scheme for generating beacon signal 34 enables penetration of beacon signal 34 to the predetermined penetration distance 36. If beacon signal 34 comes into contact with object 32, beacon signal 34 is reflected back to radar system 22 as a return signal 38. Return signal 38 can subsequently be used to locate and/or construct an image of object 32 at surface 28 or in subsurface 30.

Referring to FIGS. 2-3, FIG. 2 shows a block diagram of airborne radar system 22 and FIG. 3 shows a diagram of a software defined radio implementation of radar system 22. In an embodiment, radar system 22 generally includes a software defined radio (SDR) peripheral 40, an input device 42 in communication with SDR peripheral 40, and an output device 44 in communication with SDR peripheral 40.

Input device 42 can encompass buttons, switches, a keyboard, mouse, pointing device, audio device (e.g., a microphone), and/or any other device providing input to SDR peripheral 40. Output device 44 can encompass a display, a printer, an audio device (e.g., a speaker), and/or other devices providing output from SDR peripheral 40. Input and output devices 42 and 44 can also include network connections, modems, other devices used for communications with other computer systems or devices, and/or other computer systems.

A transmitter portion 45 of radar system 22 includes a transmit output 46 of SDR peripheral 40 in communication with a power amplifier 48, which is in communication with a matching network element 50. An output 52 of matching network element 50 is in communication with a transmit input 54 of a transmit/receive switch 56. Transmit/receive switch 56 is in communication with an antenna system 58. A receiver portion 59 of radar system 22 includes a filter 60 having an input 62 in communication with a receive output 64 of transmit/receive switch 56. Filter 60 is in communication with a pre-amplifier 66, and pre-amplifier 66 is in communication with a receive input 68 of SDR peripheral 40.

Transmit/receive switch 56 is controlled by SDR peripheral 40 via a control link 70 to be in a transmit mode or a receive mode. For example, SDR peripheral 40 is configured to send a transmit enable signal 72 to switch 56 so that switch 56 is enabled to allow transmission of beacon signal 34, with its receive capability being disabled. Alternatively, SDR peripheral 40 can send a receive enable signal 74 to transmit/receive switch 56 so that switch 56 is enabled to allow receipt of return signal 38, with its transmit capability being disabled.

In general, SDR peripheral 40 generates beacon signal 34 and outputs beacon signal 34 via transmit output 46 to power amplifier 48 where beacon signal 34 is suitably amplified. Beacon signal 34 is output from power amplifier 48 to matching network element 50 where impedance matching is performed for the maximum transfer of power from the source to the load. Next, beacon signal 34 is communicated to transmit/receive switch 56. When transmit/receive switch 56 is in the transmit mode governed by transmit enable signal 72, beacon signal 34 is output from radar system 22 via antenna 58.

Following output of beacon signal 34, transmit/receive switch 56 is switched to the receive mode as governed by receive enable signal 74 so that return signal 38 can be received at radar system 22. Return signal 38 detected at antenna 58 is communicated to transmit/receive switch 56. Next, return signal 38 is communicated from switch 56 to filter 60 in order to filter spurious signals and other signal noise. Return signal 38 is then communicated from filter 60 to pre-amplifier 66. Reflected signals, such as return signal 38, reflected back to antenna 58 are typically very weak. Thus, pre-amplifier 66 suitably amplifies or strengthens return signal 38 for processing. Following amplification, return signal 38 may be input at receive input 68 of SDR peripheral 40. SDR peripheral 40 may perform signal evaluation (discussed below) of return signal 38 in order to ascertain the presence of one or more objects 32 (FIG. 1) in target zone 26. Alternatively, one or more return signals 38 may be output from SDR peripheral 40 for off-line processing by another computing system (not shown).

In an embodiment, processing, transmitting, and receiving functions of radar system 20 are implemented and controlled within SDR peripheral 40. A software defined radio system, such as SDR peripheral 40, is a radio communication system where components that have been typically implemented in hardware are instead implemented by means of software. As such, SDR peripheral 40 can provide software control of its functions, such as wide- or narrow-band operation, modulation techniques, security functions, analog-to-digital and digital-to-analog conversions, and so forth. Such a design produces a radio system which can receive and transmit widely different radio protocols (i.e., waveforms) based solely on the software used.

SDR peripheral 40 may include a main board, sometimes referred to as a motherboard, and one or more daughter-boards acting as extensions to the motherboard that cover different input/output frequencies, and so forth. The motherboard, daughter-boards, and any other processor capability is represented in SDR peripheral 40 by a processor 76. As mentioned above, components that have typically been implemented in hardware are instead implemented by means of software in SDR peripheral 40. Thus, SDR peripheral 40 further includes a memory element 78 that is in communication with processor 76.

Memory element 78 has executable code 80 stored therein, that instructs processor 76 to perform a number of operations pertinent to the function of radar system 22. Memory element 78 may be any volatile or non-volatile mass storage system readable by processor 76. Memory element 78 may also include cooperating or interconnected computer readable media, which exist exclusively on SDR peripheral 40 or are distributed among multiple interconnected computing systems (not shown) that may be local or remote.

Executable code 80 can include a surface penetrating investigation process 82 and a return signal evaluation process 84. In an exemplary scenario, surface penetrating investigation process 82 can include software code modules that perform transmit sequence generation 86, waveform generation 88, modulation functions 90, transmit functions 92, switch control 94, and receive functions 96. Return signal evaluation process 84 can include software code modules that perform receive sequence generation 98, demodulation functions 100, return signal evaluation functions 102, and report generation functions 104.

Those skilled in the art will recognize that the software functions performed by SDR peripheral 40 can vary from that which is shown and can be organized differently from that which is shown. Furthermore, although embodiments are described herein as being implemented in a software defined radio architecture, various functions of radar system 22 can alternatively be implemented in hardware. Additionally, various functions and components of radar system 22 may be implemented at different locations. For example, in a hardware implementation, transmitter portion 45 of radar system 22 need not be co-located with the receiver portion 59. Likewise, processor 76 of radar system 22 need not be co-located with either of the transmitter or receiver portions 45 and 59, respectively.

Figure 4:
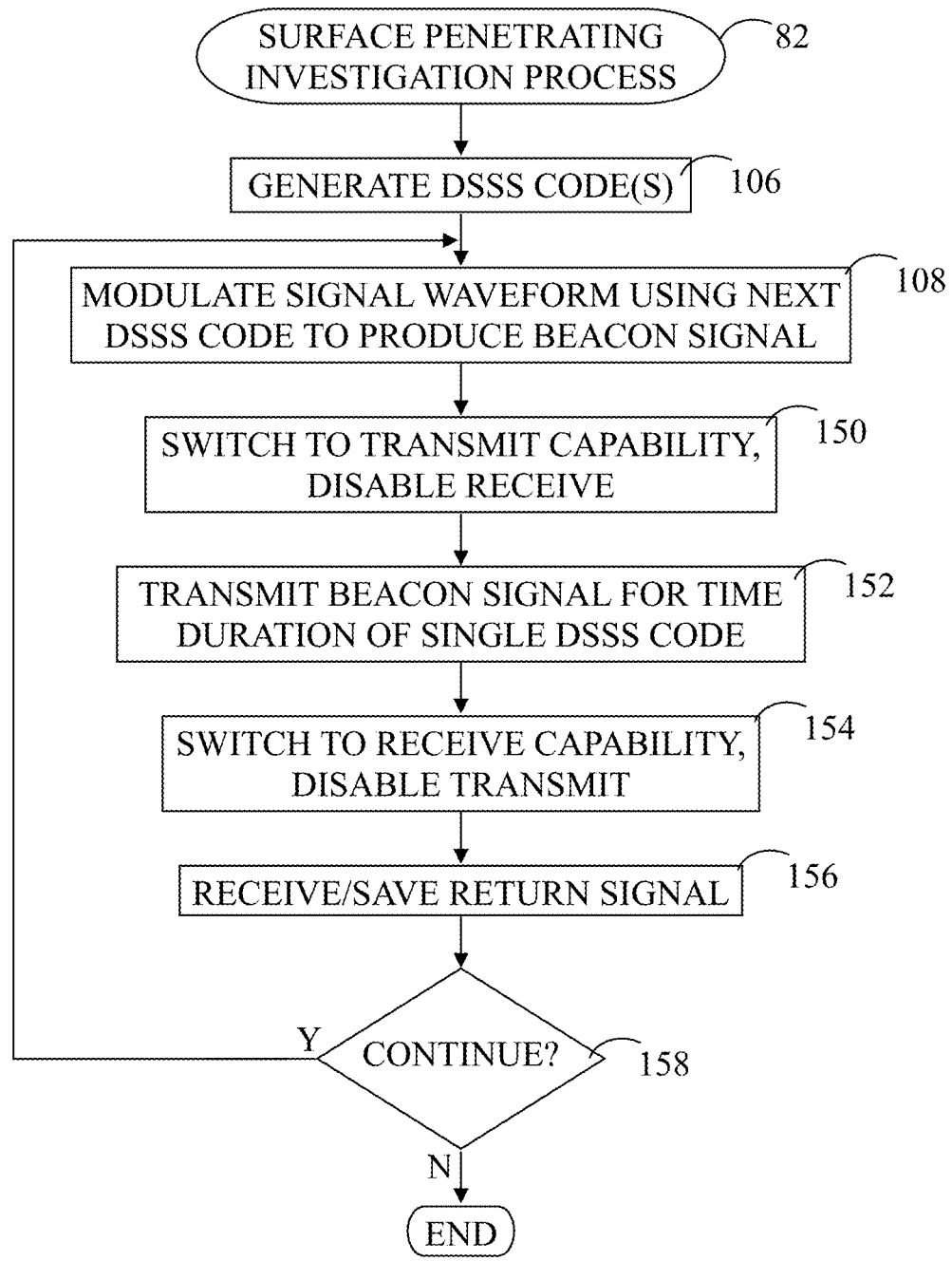
FIG. 4 shows a flowchart of a surface penetrating investigation process performed by the radar system of FIG. 1.

FIG. 4 shows a flowchart of surface penetrating investigation process 82 performed by radar system 22 (FIG. 2). In general, surface penetrating investigation process 82 is executed to generate beacon signal 34 (FIG. 1) using spread spectrum techniques, to transmit beacon signal 34 toward target zone 26 (FIG. 1), and to receive return signal 38 (FIG. 1).

Surface penetrating investigation process 82 begins with a task 106. At task 106, direct sequence spread spectrum (DSSS) code (discussed below) is generated.

In response to task 106, a task 108 is performed. At task 108, a signal waveform is modulated using the "next" DSSS code generated at task 106 to produce beacon signal 34 (FIG. 1). It should be understood that at a first iteration of task 108, the "next" DSSS code is a first DSSS code in a set of one or more DSSS codes generated at task 106.

Figure 5:
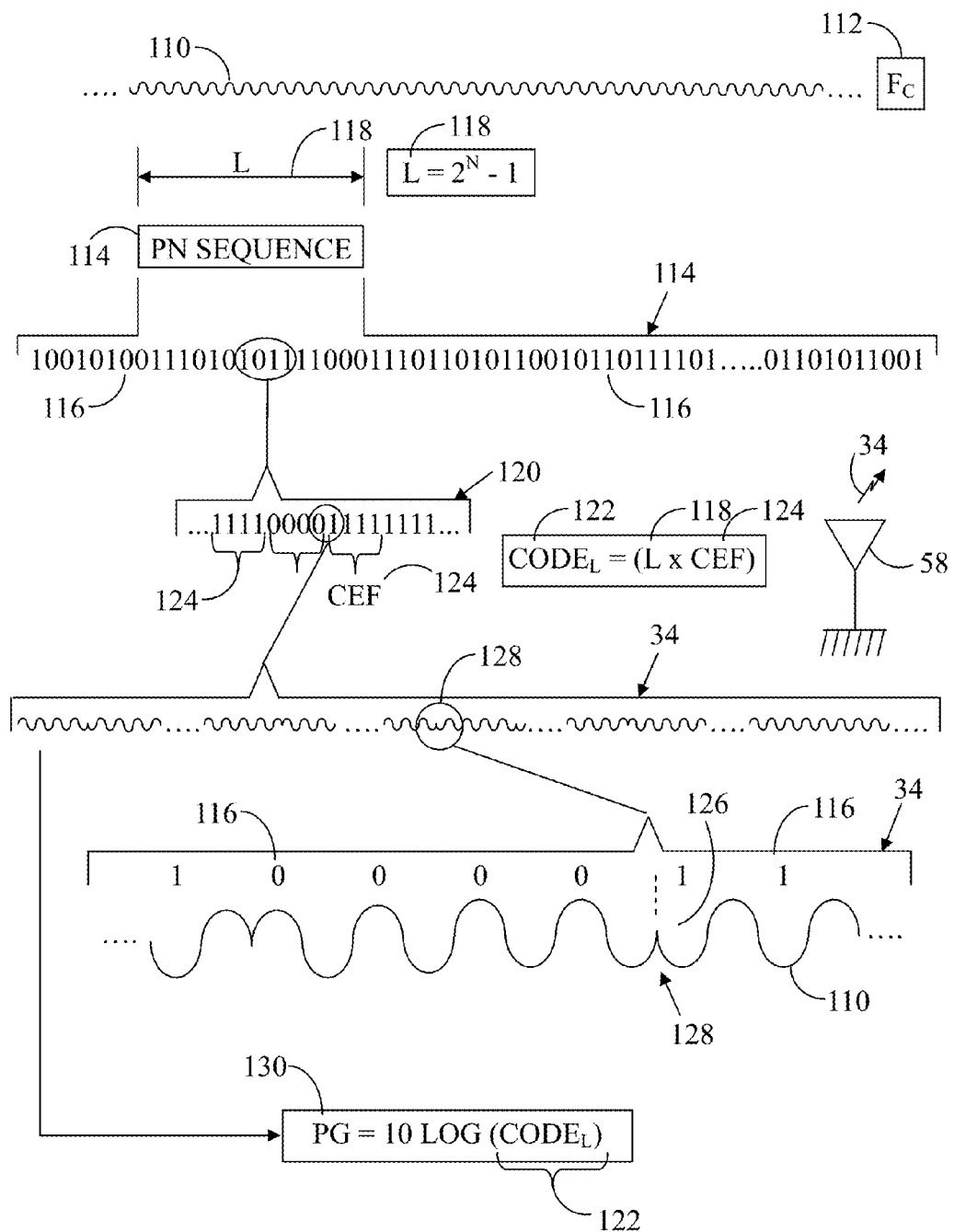
FIG. 5 shows a diagram of a direct sequence spread spectrum (DSSS) implementation of the present invention.

Referring to FIG. 5 in connection with tasks 106 and 108, FIG. 5 shows a diagram of a direct sequence spread spectrum (DSSS) implementation of the present invention. DSSS is a spread spectrum modulation technique in which the transmitted signal is spread out in the time-domain, while the pulse bandwidth and amplitude is reduced in the frequency-domain. A receiver compresses this time sequence back into a pulse, hence the often-used term of pulse compression. DSSS code phase-modulates a sine wave pseudorandomly with a continuous string of pseudo-noise (PN) code symbols, typically referred to as "chips." This continuous string of PN chips is referred to as a pseudo-noise (PN) sequence. Because of the low power density inherent in spread spectrum modulation, recovery of baseband information from the spread spectrum signal can be accomplished only through correlating the received signal (plus noise) with an exact replica of the transmitted signal. A spread-spectrum receiver can use non-coherent demodulation, matched filtering, and stacking to detect the known signal buried in noise. This signal processing method permits signal detection in high noise environments.

As shown in FIG. 5, a continuous wave signal 110, for example, a sine wave, is provided. Continuous wave signal 110 may be generated at SDR peripheral 40 by executing waveform generation software code module 88 (FIG. 3) of executable code 80 (FIG. 3). Of course in alternative embodiments, continuous wave signal 110 may be provided via a hardware oscillator (not shown). Continuous wave signal 110 exhibits a frequency 112, $F_C$, that can be any of various useable carrier frequencies for continuous wave signal 110, such as 250 MHz, 500 MHz, 1 GHz, 5 GHz, and the like.

FIG. 5 further illustrates an exemplary pseudo-noise (PN) sequence 114. In accordance with task 106 of surface penetrating investigation process 82 (FIG. 4), PN sequence 114 may be generated at SDR peripheral 40 by executing transmit sequence generation software code module 86 (FIG. 3) of executable code 80 (FIG. 3). In an embodiment, PN sequence 114 is based on a maximal-length, binary sequence (m-sequence) of chips 116. A chip 116 is the fundamental unit of PN sequence 114 and can be either a one (1) or a zero (0). Thus, PN sequence 114 includes a sequence of ones and zeros (chips 116) and is typically generated by a linear feedback shift register of length, N. This sequence of chips 116 is referred to as a "pseudo-noise" sequence because they are similar to noise and satisfy one or more of the standard tests for statistical randomness.

A sequence length 118, L, of PN sequence 114 is related to the number of chips 116 in PN sequence 114, expressly, sequence length 118 is $2^N-1$ "chips" 116 long, where N is the number of stages in the linear feedback shift register. An arrangement of the feedback taps of the linear feedback shift register establish the deterministic PN sequence 114 produced. Hence, different PN sequences 114 of the same sequence length 118 have a very low cross correlation product and are said to be orthogonal. For brevity, only a portion of PN sequence 114 is shown, where additional chips 116 of PN sequence 114 are represented by ellipses located within PN sequence 114.

In conventional DSSS for communication systems, a data signal that is intended for transmission is coded or modulated by a DSSS code, e.g., PN sequence 114, and this combined DSSS signal output can then be used to modulate a carrier wave, e.g., continuous wave signal 110. However, in an embodiment, continuous wave signal 110, and hence modulated beacon signal 34, is absent a data signal component. That is, no data is being transmitted. Under such a circumstance, continuous wave signal 110 may be referred to as a zero payload carrier signal. Instead, beacon signal 34 is only a function of PN sequence 114 and continuous wave signal 110. Accordingly, beacon signal 34 is a radar signal that is referred to as a "beacon" and radar system 22 (FIG. 1) operates in "beacon mode" because signal 34 is used for location identification purposes, rather than for transmitting a data signal.

In an embodiment, PN sequence 114 is expanded to produce a direct sequence spread spectrum (DSSS) code 120 that will be used in phase shift modulating continuous wave signal 110. For brevity, only a small portion of DSSS code 120 is shown, where additional chips 116 of DSSS code 120 are represented by ellipses located on opposing ends of DSSS code 120. In accordance with a preferred embodiment, DSSS code 120 has a code length 122, $CODE_L$, that is a function of sequence length 118 of PN sequence 114 and a chip expansion factor 124. Chip expansion factor 124 defines a number of cycles of continuous wave signal 110 used to represent each chip 116 in PN sequence 114, and is an integer number that is preferably greater than one. Said another way, each chip 116 in PN sequence 114 may be represented by multiple cycles of continuous wave signal 110, as specified by chip expansion factor 124. Chip expansion factor 124 is applied to PN sequence 114 to yield DSSS code 120 of a particular code length 122.

As presented in FIG. 5 for illustrative purposes, chip expansion factor 124 is shown as being the integer number four (4). Chip expansion factor 124 is applied to PN sequence 114 by successively replicating each chip 116 in PN sequence 114 by chip expansion factor 124 to yield DSSS code 120. In this example, each instance of chip 116 that is the binary digit "1" in PN sequence 114 is expanded to four (4) chips 116 of the binary digit "1" in DSSS code 120. Likewise, each instance of chip 116 that is the binary digit "0" in PN sequence 114 is expanded to four (4) chips 116 of the binary digit "0" in DSSS code 120. In this example where chip expansion factor 124 is four (4) cycles of continuous wave signal 110 per chip 116 of PN sequence 114, code length 122 of DSSS code 120 is four times greater than sequence length 118 of PN sequence 114. The selection of sequence length 118 and chip expansion factor 124 for DSSS code 120 will be discussed in connection with an example presented in FIG. 6.

In accordance with task 108, DSSS code 120 (characterized by PN sequence 114 and expanded by chip expansion factor 124) is used to modulate continuous wave signal 110 by, for example, phase-shift keying. Phase-shift keying is a digital modulation scheme that typically conveys data by changing, or modulating, the phase of a reference signal (the carrier wave). As illustrated in FIG. 5, each chip 116 of DSSS code 120 can be either the binary digit "1" or the binary digit "0." The change from a "0" chip 116 to a "1" chip 116, and the change from a "1" chip 116 to a "0" chip 116, is represented by a phase change 126 in continuous wave signal 110. A phase change 126 from "0" chip 116 to "1" chip 116 is presented in an enlarged view 128 of beacon signal 34 for illustrative purposes.

In a spread spectrum system, such as radar system 22, the process gain (also referred to as "processing gain") is the ratio of the spread (or radiofrequency) bandwidth to the unspread (or baseband) bandwidth. That is, the process gain helps to measure the performance advantage of spread spectrum against narrowband waveforms. In accordance with an embodiment, radar system 22 uses a sliding correlator, i.e., a matched filter, at SDR peripheral 40 to search for DSSS code 120 in return signal 38 (FIG. 1). When DSSS code 120 is matched perfectly (in time) with a replica signal (discussed below) all of the energy in DSSS code 120 is added coherently, forming a correlation peak. The height of the correlation peak compared to the non-peak is this process gain. Thus, the process gain can be viewed as a signal to noise ratio at the receiver as the height of the correlation peak, i.e. the signal to noise ratio after the dispreading operation in which PN sequence 114 is removed.

As further shown in FIG. 5, a process gain 130, PG, can be expressed as a function of code length 122 of DSSS code 120, where code length 122 is a product of sequence length 118 of PN sequence 114 and chip expansion factor 124. That is, process gain 130 is $10 \log(CODE_L)$ expressed in decibels, dB, where code length 122, $CODE_L$, is (L×CEF). Accordingly, process gain 122 is a function of both sequence length 118 and chip expansion factor 124.

PN sequence 114 can theoretically have unlimited sequence length 118. Typical values for sequence length 118 are one thousand twenty three (1023) or two thousand forty seven (2047) chips 116 long. Furthermore, chip expansion factor 124 is preferably selected to be greater than one such that a bandwidth of beacon signal 34 is approximately equal to frequency 112 divided by chip expansion factor 124. In an example, sequence length 118 of two thousand forty seven (2047) chips and chip expansion factor 124 of five hundred and twelve (512) cycles per chip yields process gain 130 of sixty (60) decibels.

In the software defined radio approach of radar system 22 (FIG. 1), process gain 130 can be dynamically controlled via sequence length 118 and chip expansion factor 124 from one transmitted beacon signal 34 to the next transmitted beacon signal 34. That is, sequence length 118 of PN sequence 114 and/or chip expansion factor 124 can be advantageously varied to provide sufficient process gain 130 so as to enable penetration of beacon signal 34 into target zone 26 (FIG. 1) at desired penetration distances 36 (FIG. 1) and detection of the reflected return signal 38 from target zone 26.

Figure 6:
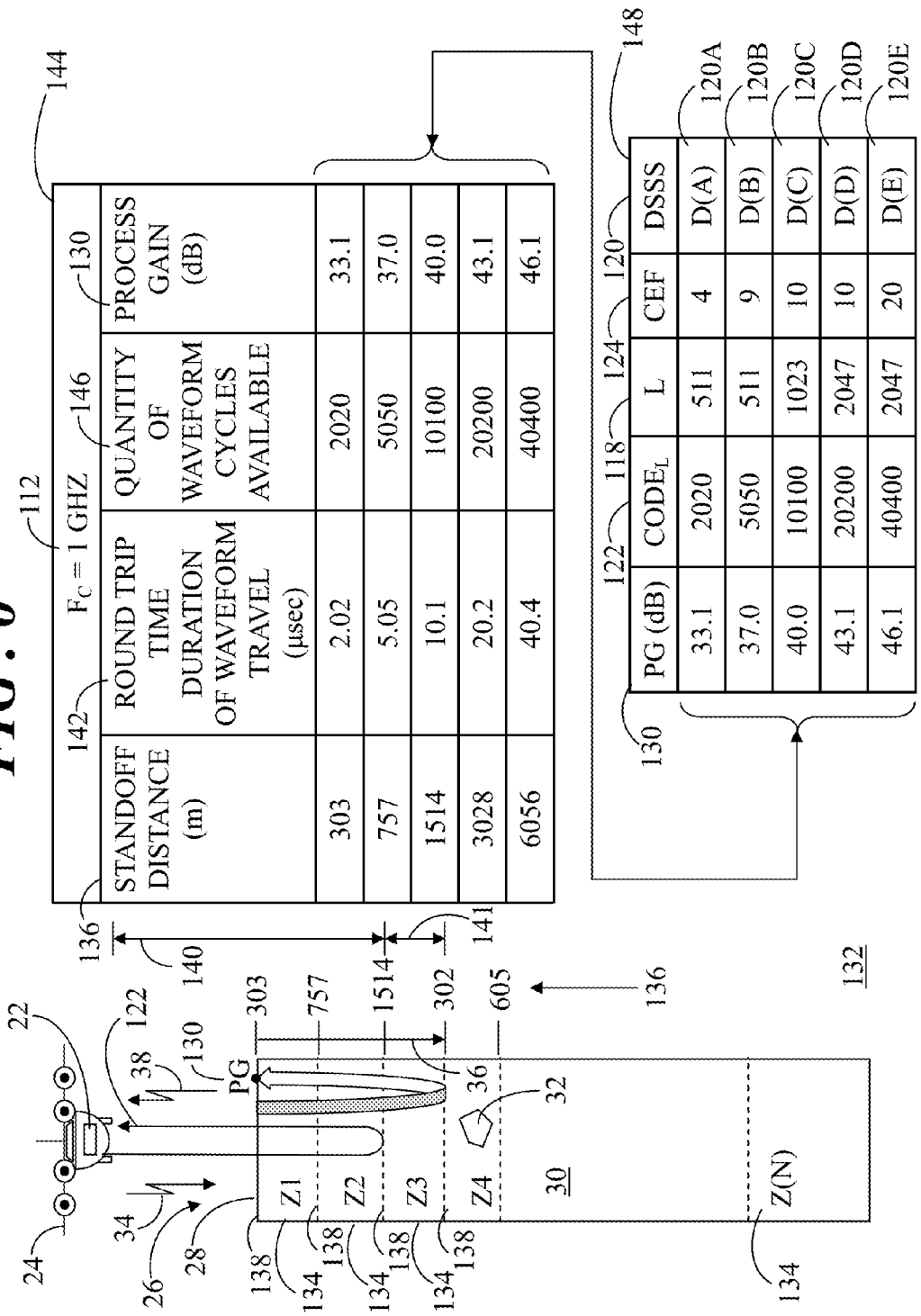
FIG. 6 shows a simplified exemplary scenario in which process gain for the radar system is dynamically controlled.

Referring now to FIG. 6, FIG. 6 shows a simplified exemplary scenario 132 in which process gain 130 for radar system 22 is dynamically controlled to enable penetration of beacon signal 34 into target zone 26 and detection of the reflected return signal 38 from target zone 26 at desired penetration distances 36 at or below surface 28. More particularly, a suitable sequence length, L, 118 and chip expansion factor, CEF, 124, are selected for a predetermined frequency 112, $F_C$, of continuous wave signal 110 (FIG. 5) to yield DSSS code 120 having code length 122 corresponding to the time duration of radio wave travel between transmitter portion 45 (FIG. 2), target zone 26, and receiver portion 59 (FIG. 2) of radar system 22. Code length 122 is represented in exemplary scenario 132 of FIG. 5 by the curved arrow representing the round trip time duration of signal transmission and return.

In this example, a set of DSSS codes 120 having differing process gains 130 may be generated in order to achieve different penetration distances 36 into target zone 26. Accordingly, target zone 26 may be subdivided into a plurality of zone sections 134 of varying distances at or below surface 28. Next, a standoff distance 136 is determined between airplane 24 and a boundary of interest, referred to herein as an onset boundary 138, of each of zone sections 134. In this example, standoff distance 136 between onset boundary 138 for a first one of zone sections 134 (labeled Z1) and airplane 24 is three hundred and three (303) meters. Standoff distance 136 between onset boundary 138 of a second one of zone sections 134 (labeled Z2) and airplane 24 is seven hundred and fifty seven (757) meters, and so forth.

Standoff distance 136 demarcates a blind zone 140 for receiver portion 59 (FIG. 2) during which receiver portion 59 is disabled so that return signal 38 will not be received. Standoff distance 136 further establishes a predetermined query distance 141. In this example, zone sections 134 below standoff distance 136 are considered within the query distance 141, i.e., at the depth to be investigated by radar system 22.

At each standoff distance 136, a roundtrip time duration 142 for travel of continuous wave signal 110 (FIG. 5) can be determined. In general, radio waves, such as continuous wave signal 110, can travel at the speed of light, i.e., 300,000 km/sec, in free space. However, as known to those skilled in the art, the actual speed of radio waves, i.e., the propagation velocity, changes according to the material that the radio wave is traveling through. That is, radio waves traveling in free space will travel at the speed of light, whereas, radio waves traveling in media other than free space tend to travel slower than the speed of light. For simplicity herein, roundtrip time duration 142 is determined for continuous wave signal 110 traveling in free space. For example, since standoff distance 136 between onset boundary 138 of a first one of zone sections 134 (labeled Z1) and airplane 24 is three hundred and three (303) meters, the roundtrip distance is six hundred and six (606) meters. Consequently, roundtrip time duration 142 is 606 m/300,000 km/sec, or 2.02 microseconds. Thus, roundtrip time duration 142 can be readily determined for each standoff distance 136. Each determined roundtrip time duration 142 is presented in a first table 144 associated with standoff distance 136.

At the predetermined frequency 112 of continuous wave signal 110 (FIG. 5), and in this example at 1 GHz, a quantity of cycles of continuous wave signal 110 will occur, i.e., propagate during round trip time duration 142. For example, at roundtrip time duration 142 of 2.02 microseconds, a quantity of cycles available value 146 is therefore 1 GHz multiplied by 2.02 microseconds, or 2020 cycles available. Thus, quantity of cycles available value 146 at frequency 112 can be readily determined for each roundtrip time duration 142. Each value 146 is presented in first table 144 associated with round trip time duration 142 and standoff distance 136.

In a preferred embodiment, DSSS code 120 is generated such that code length 122, i.e., sequence length 118 of PN sequence 114 (FIG. 5) expanded by chip expansion factor 124, corresponds to a time duration of radio wave travel between transmitter portion 45 (FIG. 2), target zone 26, and receiver portion 59 (FIG. 2) at a given frequency 112 of continuous wave signal 110. More particularly, DSSS code 120 is generated having code length 122 approximately equivalent to roundtrip time duration 142 for transmission of a single instance of DSSS code 120 at frequency 112 between airborne platform 24 and transmitter and receiver portions 45 and 59 of radar system 22. Each chip 116 (FIG. 5) of DSSS code 120 is represented by, or corresponds with, a single cycle of continuous wave signal 110 at frequency 112. Accordingly, a desired code length 122 for each DSSS code 120 is approximately equal to quantity of cycles available value 146 at frequency 112.

As discussed in connection with FIGS. 5 and 6, process gain 130, PG, can be expressed as a function of code length 122 of DSSS code 120. Accordingly, since code length 122 is approximately equal to quantity of cycles available value 146 of continuous wave signal 110 (FIG. 5) at frequency 112, process gain 130 can be readily computed as 10 times log of value 146, expressed in decibels, dB. As shown, process gain 130 needed to achieve the appropriate query distance 141 and still receive a detectable reflection, i.e., return signal 38 for the first one of zone sections 134, labeled Z1, is 33.1 dB. Process gain 130 needed to achieve the appropriate penetration distance 141 for the second one of zone sections 134, labeled Z2, is 37.0 dB. Process gain 130 needed to achieve the appropriate penetration distance 141 for the third one of zone sections 134, labeled Z3, is 40.0 dB, and so forth.

Once process gain 130 is determined for each of zone sections 134, a suitable sequence length 118 and chip expansion factor 124 can be selected to generate DSSS code 120 having code length 122. A second table 148 presented in FIG. 6 illustrates an exemplary sequence length 118 and chip expansion factor 124 for each DSSS code 120. For example, sequence length 118, for PN sequence 114 (FIG. 5) is selected to be 511 ($2^N-1$, where N=9) and chip expansion factor 124 is selected to be 4 so that a first DSSS code 120A has code length 122 of 2044, and therefore process gain 130 of approximately 33.1 dB. Likewise, sequence length 118, for PN sequence 114 (FIG. 5) is also selected to be 511, but chip expansion factor 124 is selected to be 9 so that a second DSSS code 120B has code length 122 of 4599, and therefore process gain 130 of approximately 37 dB.

It should be noted that with first and second DSSS codes 120A and 120B sequence length 118 stays the same, but chip expansion factor 124 changes to achieve the desired process gains 130. However, it should be understood that in alternative embodiments, chip expansion factor 124 may be held constant for each of DSSS codes 120, and sequence length 118 may be varied. This condition is illustrated in connection with a third DSSS code 120C and a fourth DSSS code 120D. A longer sequence length 118 for PN sequence 114 (FIG. 5), but a lower chip expansion factor 124, can achieve better noise cancellation effects but at the price of a wider bandwidth. Conversely, longer chip expansion factor 124 can narrow the bandwidth, perhaps sacrificing some noise cancellation effects. Since DSSS codes 120 are generated by SDR 40 (FIG. 2) executing transmit sequence generation code module 86 (FIG. 3), process gain 130 can be dynamically controlled by selecting the appropriate sequence length, L, 118 and chip expansion factor, CEF, 124, for a predetermined frequency 112, $F_C$, of continuous wave signal 110 (FIG. 5) and taking into account various environmental factors.

Referring back to surface penetrating investigation process 82 (FIG. 4), execution of task 106 can yield at least one DSSS code 120. Preferably execution of task 106 can yield a set of DSSS codes, e.g., DSSS code 120A, DSSS code 120B, DSSS code 120C, DSSS code 120D, and a DSSS code 120E (FIG. 6), for investigating various zone sections 134 (FIG. 6) of target zone 26 (FIG. 6). The one or more DSSS codes 120 may be stored at SDR peripheral 40, or alternatively, DSSS codes 120 may be generated immediately prior to execution of modulation task 108. In either instance, following task 108 in which continuous wave signal 110 is modulated using a "next" one of DSSS codes 120, process 82 continues with a task 150.

At task 150, radar system 22 is switched to transmit capability and receive capability is disabled. For example, transmit enable signal 72 (FIG. 2) may be generated at SDR peripheral 40 and communicated to transmit/receive switch 56 (FIG. 2) via control link 70 (FIG. 2) by executing switch control code module 94 (FIG. 3) of executable code 80 (FIG. 3).

Process control continues with a task 152. At task 152, beacon signal 34 (FIG. 2) is transmitted for a time duration sufficient to output a single instance of DSSS code 120. Transmission of beacon signal 34 may be performed at transmitter portion 45 (FIG. 2) of radar system 22 through execution of transmit function code module 92 (FIG. 3) of executable code 80 (FIG. 3). By way of example, during a first iteration of transmit task 152, beacon signal 34 may be modulated by first DSSS code 120A (FIG. 6) and is thus transmitted from radar system for approximately 2.02 microseconds, i.e., equivalent to roundtrip time duration 142 (FIG. 6), in order to transmit one instance of DSSS code 120A.

Following task 152, process 82 continues with a task 154. At task 154, radar system 22 is switched to receive capability and transmit capability is disabled. For example, receive enable signal 74 (FIG. 2) may be generated at SDR peripheral 40 and communicated to transmit/receive switch 56 (FIG. 2) via control link 70 (FIG. 2) by executing switch control code module 94 (FIG. 3) of executable code 80.

In response to switching task 154, surface penetrating investigation process 82 continues with a task 156. At task 156, return signal 38 (FIG. 2) is received at receiver portion 59 (FIG. 2) of radar system 22. Receipt of return signal 38 may be performed through execution of receive function code module 96 (FIG. 3) of executable code 80. Referring briefly to FIG. 6, return signal 38 may be a reflection signal from object 32 that is deeper than standoff distance 136. For example, DSSS code 120A having code length 122 of 2044 queries distances greater than standoff distance 136 of 303. DSSS code 120B having code length 122 of 4599 queries distances (predetermined query distances) greater than standoff distance 136 of 757, and so forth. The received return signal 38 may then be saved in, for example, memory element 78 of SDR peripheral 40 for later processing.

With reference back to FIG. 4, following task 156, process 82 continues with a query task 158. At task 158, a determination is made as to whether execution of surface penetrating investigation process 82 is to continue. For example, when a different DSSS code 120 is to be used for transmission, program control loops back to task 108 to modulate continuous wave signal 110 (FIG. 5) using the "next" DSSS code 120 to produce beacon signal 34, to subsequently transmit beacon signal 34, and receive return signal 38. Referring briefly to FIG. 6, in a next iteration of task 108, second DSSS code 120B may be selected for use in modulating continuous wave signal 110. However, in yet another example, the "next" DSSS code 120 may be the same DSSS code 120 that was used previously to modulate continuous wave signal 110. When a determination is made at query task 158 that execution of surface penetrating investigation process 82 is to be discontinued, process 82 ends with one or more return signals 38 having been received that may be evaluated instantly or off-line.

Figure 7:
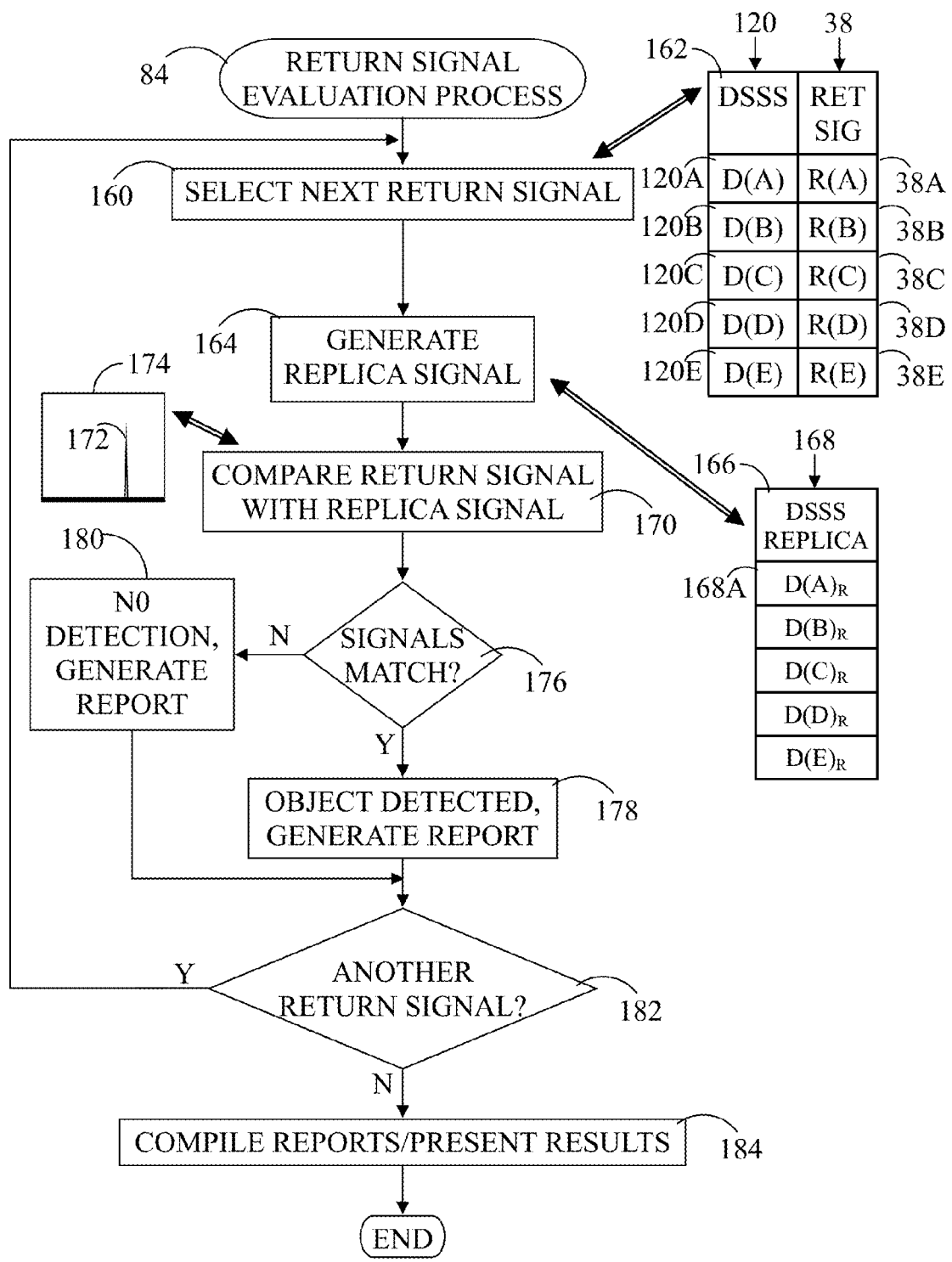
FIG. 7 shows a flowchart of a return signal evaluation process executed in accordance with an embodiment of the present invention.

FIG. 7 shows a flowchart of return signal evaluation process 84 (FIG. 3) executed in accordance with an embodiment of the present invention. In general, return signal evaluation process 84 is executed to evaluate one or more return signals 38 collected during execution of surface penetrating investigation process 82 (FIG. 4) in order to ascertain a presence of object 32 (FIG. 1) in target zone 26 (FIG. 1). In the illustrated embodiment, return signal evaluation process 84 is executed at SDR peripheral 84. However, in alternative embodiments, return signal evaluation process 84 may be performed off-line using one or more alternative computing systems.

Process 84 begins with a task 160. At task 160, a next return signal 38 (FIG. 1) is selected for evaluation. It should be understood that at a first iteration of task 160, the "next" return signal 38 is a first return signal 38 in a set of one return signals 38 received and saved at task 156 (FIG. 4) of surface penetration investigation process 82 (FIG. 4). An exemplary table 162 is presented in FIG. 7 in connection with task 160. Table 162 represents a storage element at which return signals 38, for example, a first return signal 38A, a second return signal 38B, a third return signal 38C, a fourth return signal 38D, and a fifth return signal 38E were stored in connection with information identifying a particular one of DSSS codes, for example, first DSSS code 120A, second DSSS code 120B, third DSSS code 120C, fourth DSSS code 120D, and fifth DSSS code 120E, that was transmitted toward target zone 26 (FIG. 1). During a first iteration of task 160, first return signal 38A may be selected from table 162.

Evaluation process 84 continues with a task 164. At task 164, a replica signal of the selected return signal 38 is generated. The replica signal may be generated at SDR peripheral 40 by executing receive sequence generation code module 98 (FIG. 3) of executable code 80 (FIG. 3). For illustrative purposes, another exemplary table 166 is presented in FIG. 7 in connection with task 164. Table 166 represents a compilation of replica signals 168. In this example, execution of task 164 may result in the generation of a first replica signal 168A characterized by DSSS code 120. More particularly, first replica signal 168A is a spread code identical to DSSS code 120A. First replica signal 168A may be generated by expanding PN sequence 114 (FIG. 5) by chip expansion factor 124 (FIG. 5) for first DSSS code 120A.

In response to task 164, a task 170 is performed. At task 170, the selected one of return signals 38, e.g., first return signal 38A, is compared with replica signal 168, e.g., first replica signal 168A, generated at task 164. At task 170, demodulation function code module 100 (FIG. 3) and return signal evaluation function 102 (FIG. 3) of executable code 80 (FIG. 3) may be executed to implement comparison task 170. For example, at receiver portion 59 (FIG. 2), return signal 38 is demodulated to extract DSSS code 120 from continuous wave signal 110 (FIG. 5). Next, a sliding correlator function, also referred to as a matched filter, may be used to detect the presence of DSSS code 120 in the demodulated return signal 38. When DSSS code 120A in first return signal 38A matches perfectly in time with first replica signal 168A, all of the energy in DSSS code 120A of first return signal 38A is added coherently forming a correlation peak. A typical correlation peak 172 of DSSS code 120 is presented in a graph 174 in FIG. 7.

A query task 176 is performed in connection with task 170. A query task 176, a determination is made as to whether return signal 38, e.g., first return signal 38A, contains DSSS code 120 that matches replica signal 168, e.g., first replica signal 168A. When a determination is made at query task 176 that return signal 38 contains DSSS code 120 matching replica signal 168, return signal 38 is indeed a reflection of beacon signal 34 (FIG. 1) from object 32 (FIG. 1). That is, object 32 having different electromagnetic properties than the surrounding media has been detected. As such, program control proceeds to a task 178.

At task 178, a report or results may be generated identifying the detection of object 32. Alternatively, when a determination is made at query task 176 that return signal 38 does not contains DSSS code 120 matching replica signal 168, then return signal 38 is not a reflection of beacon signal 34 (FIG. 1) from object 32 (FIG. 1). Accordingly, program control proceeds to a task 180, where the appropriate report or results may be generated indicating that object 32 was not detected.

Following either of tasks 178 and 180, return signal evaluation process 84 continues with a query task 182. At query task 182, a determination is made as to whether there is another return signal 38 that is to be evaluated. For example, iterative control of return signal evaluation process 84, can enable evaluation of each of return signals 38, e.g., first, second, third, fourth, and fifth return signals 38A, 38B, 38C, 38D, and 38E, stored in table 162. When there is another return signal 38 that is to be evaluated, program control loops back to task 160 to select and evaluate the next return signal 38. However, when there are no further return signals 38 to be evaluated, process control continues with a task 184.

At task 184, reports are compiled and the results are presented. Following task 184, return signal evaluation process 84 exits.

Figure 8:
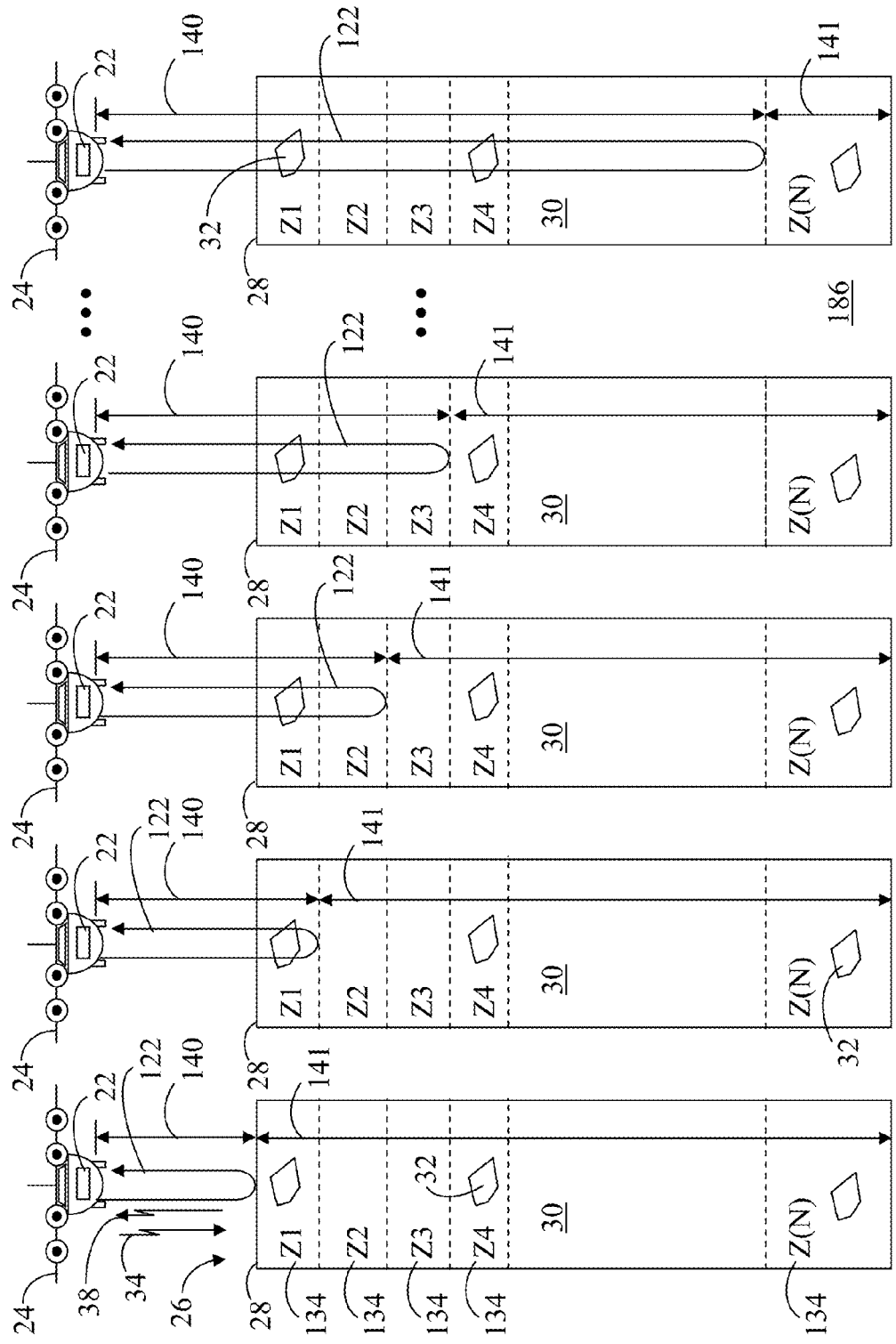
FIG. 8 shows a diagram representing the transmission of a beacon signal modulated by a set of DSSS codes having increasingly longer code lengths in order to investigate a target zone at increasingly greater penetration distances.
Figure 9:
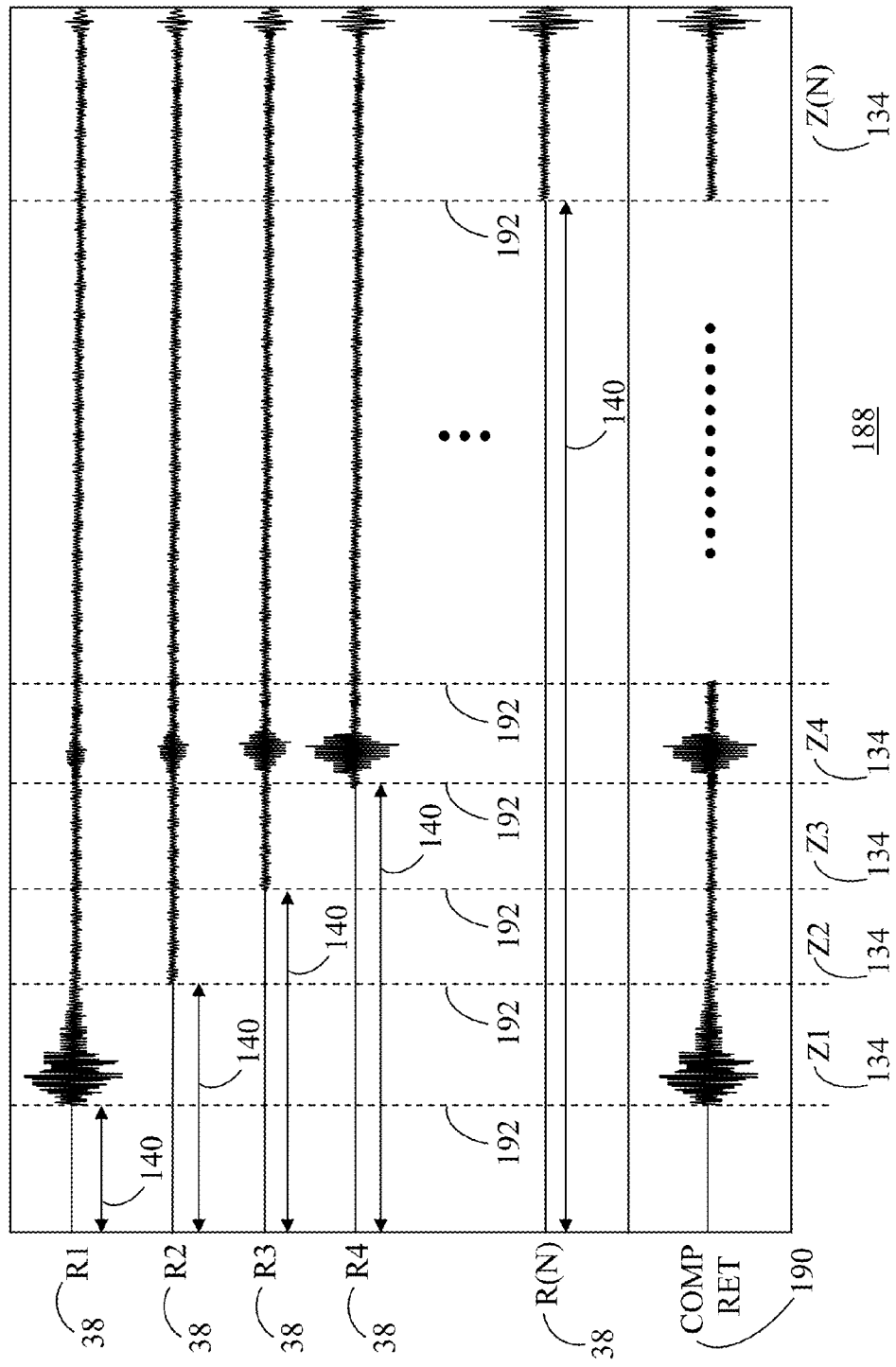
FIG. 9 shows a chart illustrating a presentation of results compiled in accordance with execution of the return signal evaluation process and with respect to the diagram of FIG. 8.

Referring to FIGS. 8 and 9, FIG. 8 shows a diagram 186 representing the transmission of beacon signal 34 modulated by DSSS code 120 (FIG. 5) having increasingly longer code lengths 122 in order to investigate surface 28 and subsurface region 30 of target zone 26 at increasingly greater penetration distances 36. FIG. 9 shows a chart 188 illustrating a presentation of results compiled in accordance with task 184 (FIG. 7) of return signal evaluation process 84 (FIG. 7) and with respect to diagram 186. Again, each code length 122 is represented in diagram 186 by the curved arrow representing the round trip time duration of signal transmission and return.

In accordance with the methodology described above, a set of DSSS codes 120 (FIG. 5) are transmitted in succession via beacon signal 34. Each DSSS code 120 has a code length 122 that is successively longer than code lengths 122 of previous DSSS codes 120. Consequently, each blind zone 140 gets larger, as shown in FIG. 8. The appropriate zone sections 134 of target zone 26 that are investigated are located below blind zone 140. Advantageously, as code length 118 increases for each DSSS code 120, process gain 130 (FIG. 5) for that DSSS code 120 increases as well, therefore enabling greater query distances 141. FIGS. 8 and 9 include ellipses indicating that target zone 26 may be subdivided into more zone sections 134 than that which is shown in order to thoroughly investigate target zone 26 at a plurality of query distances 141 below surface 28.

In the example shown in FIGS. 8 and 9, for each successively transmitted DSSS code 120 used to form beacon signal 34, there is a corresponding return signal 38. Processing takes an appropriate section of each of return signals 38 and forms a single composite return signal 190. The contributing section from each return signal 38 is defined by a pair of blind zone boundaries 192 as shown in FIG. 9, where the section between the vertical dashed line blind zone boundaries 192 is the contribution of that return signal 38 to composite return signal 190. Consequently, as revealed in composite return signal 190, objects 32 are detected in zone sections 134, labeled Z1, Z4, and Z(N).

In summary, the present invention teaches a surface penetrating radar system and associated methodology for investigating the surface and subsurface of a target zone. The radar system and methodology implement a narrow bandwidth direct sequence spread spectrum (DSSS) code. The narrow bandwidth can minimize frequency dependent dispersion and distortion. In addition, the DSSS code enables greater process gains for adaptation to different distances of subsurface penetration and improved reflected signal recovery. More particularly, the process gain can be dynamically controlled by varying at least one of a sequence length of a pseudorandom noise (PN) sequence and a chip expansion factor from one transmitted beacon signal to the next transmitted beacon signal. A sufficient process gain allows penetration into and reflections from difficult targets and media. In addition, a standoff distance between the radar system and a first reflective object of interest enables the radar system to remain in a transmit mode for an extended time period so that a single instance of an entire DSSS code can be transmitted. In particular, the duration of transmission of a single instance of a DSSS code is calculated a priori to be slightly less than, or approximately equivalent to, a total transmit time between the receiver portion of the radar system, an onset boundary of a particular zone section, and the receiver portion of the radar system. This mode of operation advantageously allows a long, DSSS coded, narrow bandwidth signal to be used as the radar waveform, thus enabling the energy of the waveform to be distributed over the entire DSSS code so that power requirements of the transmitter can be greatly reduced. The relatively low power requirements of the radar system allow smaller and lighter radar components suitable for airborne applications, such as manned aircraft and unmanned aerial vehicles (UAV).

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on great number of variations and can be performed in a differing order then that which was presented. Additionally, although a software defined radio implementation is discussed herein, the present invention can be adapted to encompass a hardware implementation or a combination of a software/hardware implementation.

What is claimed is:

1. A method of investigating a target zone utilizing a radar system that includes a transmitter and a receiver, said method comprising:
   generating a direct sequence spread spectrum (DSSS) code having a code length corresponding to a time duration of radio wave travel between said transmitter, said target zone, and said receiver, wherein said generating operation comprises generating a pseudo-noise (PN) sequence of chips, said PN sequence having a sequence length, and expanding said PN sequence of said chips to yield said DSSS code having said code length, said code length being greater than said sequence length;
   transmitting a beacon signal from said transmitter toward said target zone, said beacon signal produced by modulating a continuous wave signal by inserting said DSSS code into said continuous wave signal;
   receiving a return signal at said receiver in response to said transmitting operation;
   comparing said return signal to a replica signal characterized by said DSSS code; and
   ascertaining a presence of an object in said target zone when said return signal corresponds to said replica signal.

2. A method as claimed in claim 1 wherein said continuous wave signal is a carrier signal that is absent a data signal component.

3. A method as claimed in claim 1 wherein said PN sequence is a maximum length sequence (m-sequence) of said chips.

4. A method as claimed in claim 1 wherein said generating operation further comprises:
   determining a total distance between said transmitter, said target zone, and said receiver;
   ascertaining a quantity of cycles of said continuous wave signal occurring over said total distance at a frequency of said continuous wave signal;
   selecting said sequence length for said PN sequence of said chips;
   selecting a chip expansion factor for said PN sequence, said chip expansion factor defining a number of said cycles of said continuous wave signal per said chip in said PN sequence of said chips; and
   said expanding operation comprises applying said chip expansion factor to each of said chips in said PN sequence to yield said DSSS code having said code length.

5. A method as claimed in claim 4 wherein:
   said selecting said chip expansion factor includes selecting said chip expansion factor that is a number greater than one such that a bandwidth of said beacon signal is approximately equal to said frequency divided by said chip expansion factor; and
   said expanding operation includes successively replicating said each chip in said PN sequence by said chip expansion factor to yield said DSSS code.

6. A method as claimed in claim 1 wherein said transmitter and said receiver are located at a reference platform spaced apart from said target zone, and said generating operation comprises:
   determining a distance between said reference platform and an onset boundary of said target zone, said distance demarcating a blind zone for said receiver; and
   generating said DSSS code having said code length corresponding to a round trip transmit duration between said reference platform and said onset boundary of said target zone such that a single instance of said DSSS code is transmittable during said round trip transmit duration.

7. A method as claimed in claim 6 wherein said DSSS code is first DSSS code, said code length is a first code length, said target zone includes a first zone section and a second zone section, said onset boundary is a first onset boundary for said first zone section, said distance is a first distance between said reference platform and said first onset boundary, and said generating operation further comprises:
   determining a second distance between said reference platform and a second onset boundary of said second zone section, said second distance being greater than said first distance;
   generating a second DSSS code having a second code length corresponding to a second round trip time duration between said reference platform and said second onset boundary of said target zone such that a single instance of said second DSSS code is transmittable during said second round trip time duration; and for each of said first and second DSSS codes, successively performing said transmitting and receiving operations.

8. A method as claimed in claim 7 wherein said return signal is a first return signal, and:
in response to said successively performing operation, said receiving operation includes receiving said first return signal following transmission of said beacon signal characterized by said first DSSS code and receiving a second return signal following transmission of said beacon signal characterized by said second DSSS code;
said comparing operation further includes comparing said second return signal to a second replica signal characterized by said second DSSS code; and
said ascertaining operation includes determining said presence of said object in one of said first and second zone sections in response to said comparing operation.

9. A method as claimed in claim 1 further comprising:
determining said code length for said DSSS code in response to a predetermined query distance for said target zone; and
identifying an approximate location of said object relative to a boundary of interest in said target zone in accordance with said predetermined query distance.

10. A method as claimed in claim 1 wherein:
said transmitting operation transmits said beacon signal for a transmit duration approximately equivalent to a time duration for transmission of a single instance of said DSSS code; and
said method further comprises disabling a transmit capability of said transmitter following transmission of said single sequence of said DSSS code.

11. A method as claimed in claim 10 further comprising synchronizing a receive capability of said receiver with said code length of said DSSS code by disabling said receive capability during said transmit duration and enabling said receive capability following said transmit duration.

12. A method as claimed in claim 1 wherein said transmitter and said receiver are co-located on an airborne platform.

13. A radar system for investigating a target zone comprising:
a transmitter configured to transmit a beacon signal toward said target zone;
a receiver configured to receive a return signal following transmission of said beacon signal;
a processor in communication with each of said transmitter and said receiver; and
a memory element in communication with said processor, said memory element having executable code stored therein, said executable code instructing said processor to perform operations comprising:
generating a pseudo-noise (PN) sequence of chips, said PN sequence having a sequence length, and expanding said PN sequence of said chips to yield a direct sequence spread spectrum (DSSS) code having a code length corresponding to a time duration of radio wave travel between said transmitter, said target zone, and said receiver, said code length being greater than said sequence length;
modulating a continuous wave signal by inserting said DSSS code into said continuous wave signal to produce said beacon signal;
comparing said return signal to a replica signal characterized by said DSSS code; and
ascertaining a presence of an object in said target zone when said return signal corresponds to said replica signal.

14. A radar system as claimed in claim 13 wherein said executable code instructs said processor to perform further operations to generate said DSSS code comprising:
determining a total distance between said transmitter, said target zone, and said receiver;
ascertaining a quantity of cycles of said continuous wave signal occurring over said total distance at a frequency of said continuous wave signal;
selecting said sequence length for said PN sequence of said chips;
selecting a chip expansion factor for said PN sequence such that a bandwidth of said beacon signal is approximately equal to said frequency divided by said chip expansion factor, said chip expansion factor defining a number of said cycles of said continuous wave signal per said chip in said PN sequence of said chips, said chip expansion factor being greater than one; and
applying said chip expansion factor to each of said chips in said PN sequence by successively replicating said each chip in said PN sequence by said chip expansion factor to yield said DSSS code having said code length.

15. A radar system as claimed in claim 13 wherein said executable code instructs said processor to perform further operations comprising:
determining said code length for said DSSS code in response to a predetermined query distance for said target zone; and
identifying an approximate location of said object relative to a boundary of interest in said target zone in accordance with said query distance.

16. A radar system as claimed in claim 13 wherein said system further comprises:
a switch element in communication with said processor;
an antenna system controlled by said switch element; and
said executable code instructs said processor to perform further operations comprising:
communicating a transmit enable signal to said switch to enable transmission of said beacon signal for a transmit duration approximately equivalent to a time duration for transmission of a single instance of said DSSS code and to disable a receive capability of said antenna system during said transmit duration; and
communicating a receive enable signal to said switch to disable transmission of said beacon signal following transmission of said single instance of said DSSS code and to enable a receive capability of said antenna system following said transmit duration.

17. A radar system as claimed in claim 13 wherein said radar system further comprises a software-defined radio with said executable code to implement said transmitter, said receiver, and said processor.

18. A method of investigating a target zone utilizing a radar system that includes a transmitter and a receiver comprising:
generating a direct sequence spread spectrum (DSSS) code having a code length corresponding to a time duration of radio wave travel between said transmitter, said target zone, and said receiver, said generating operation including:
generating a pseudo-noise (PN) sequence of chips, said PN sequence having a sequence length; and
expanding said PN sequence of said chips by successively replicating each said chip in said PN sequence by a chip expansion factor to yield said DSSS code having said code length, said code length being greater than said sequence length;
modulating a continuous wave signal by inserting said DSSS code into said continuous wave signal to produce a beacon signal, said beacon signal having a bandwidth that is approximately equal to a frequency of said continuous wave signal divided by said chip expansion factor;

transmitting said beacon signal from said transmitter toward said target zone for a transmit duration substantially equivalent to a time duration for transmission of a single instance of said DSSS code;

receiving a return signal at said receiver in response to said transmitting operation;

comparing said return signal to a replica signal characterized by said DSSS code; and ascertaining a presence of an object in said target zone when said return signal corresponds to said replica signal.

19. A method as claimed in claim 18 wherein said transmitter and said receiver are located at a reference platform spaced apart from said target zone, and said generating operation comprises:

determining a distance between said reference platform and an onset boundary of said target zone, said distance demarcating a blind zone for said receiver; and said expanding said PN sequence produces said DSSS having said code length corresponding to a round trip transmit duration between said reference platform and said onset boundary of said target zone such that said single instance of said DSSS code is transmittable during said round trip transmit duration.

* * * * *